Nov. 12, 1935.  E. A. WEISEL  2,020,446

ELECTRIC GRILLING APPARATUS

Filed Dec. 23, 1933  2 Sheets-Sheet 1

INVENTOR
EDWARD A. WEISEL
BY
A. D. T. Libby
ATTORNEY

Nov. 12, 1935.  E. A. WEISEL  2,020,446
ELECTRIC GRILLING APPARATUS
Filed Dec. 23, 1933   2 Sheets-Sheet 2
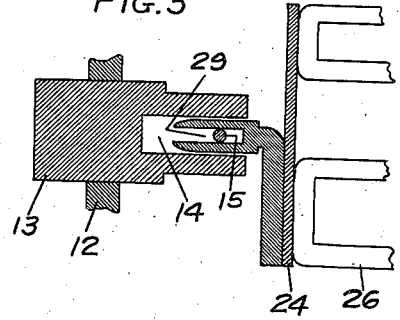
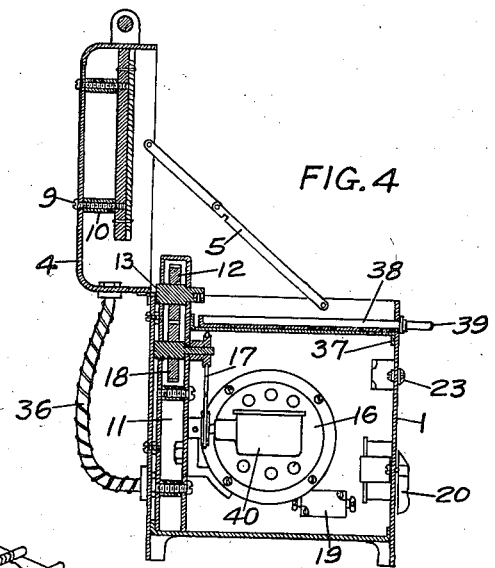
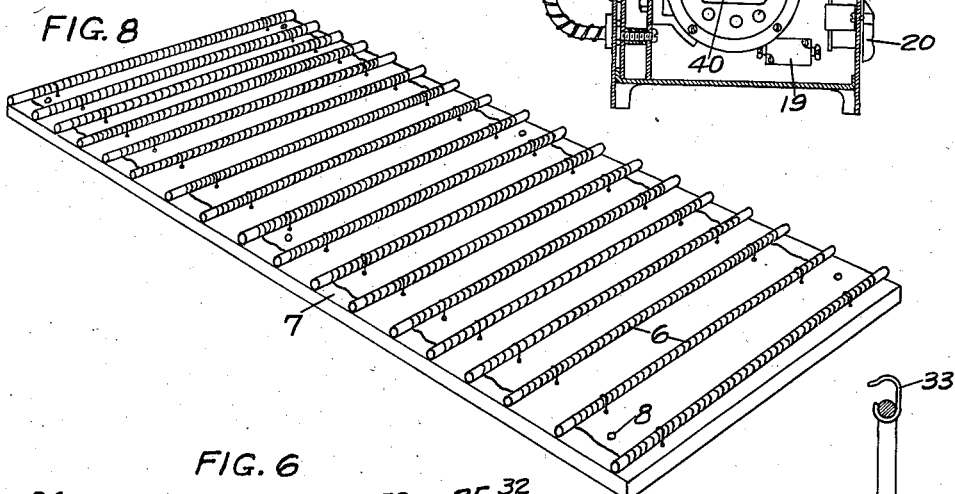
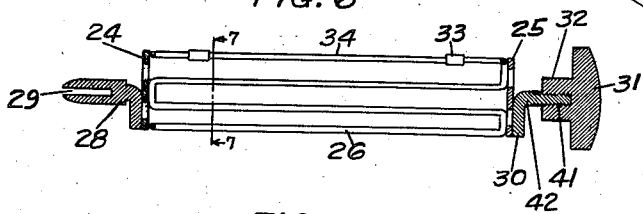
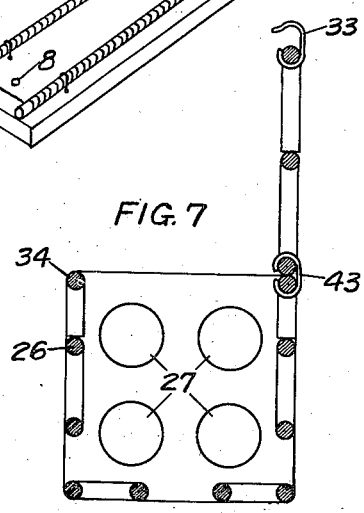
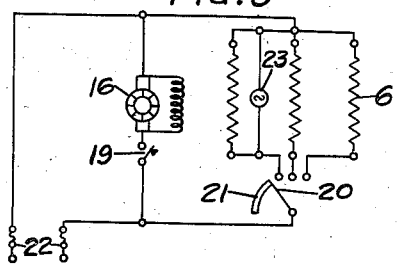
INVENTOR
EDWARD A. WEISEL
BY
A. D. T. Libby
ATTORNEY Patented Nov. 12, 1935

2,020,446

UNITED STATES PATENT OFFICE 2,020,446

ELECTRIC GRILLING APPARATUS

Edward A. Weisel, Newark, N. J.

Application December 23, 1933, Serial No. 703,807

10 Claims. (Cl. 53—5)

This invention relates to an electric grilling apparatus for the purpose of grilling or roasting beefsteak "sticks" or strips, and frankfurters or the like.

It is one of the objects of my invention to provide an improved apparatus for the purpose stated wherein a plurality of grill units are provided and arranged so that the units may be independently and quickly removed from the apparatus for the purpose of unloading or loading the grill.

It is another object of my invention to provide a grilling apparatus which is readily adaptable in size for home use as well as for use in restaurants, lunch counters, and other places requiring such an apparatus.

Another object of my invention is to provide a grilling apparatus in which the heating device is located in a part of the casing or container apart from the portion of the container carrying the grill units.

Another object of my invention is to provide an apparatus of the class described in which any number of grill units may be operated simultaneously from a common source, and furthermore, the heating device may be so controlled as to heat or grill the food only in the grill units that are being used, thereby keeping the amount of power used by the device at a minimum.

These and other objects will be clear on reading the description taken in connection with the annexed drawings, wherein:

Figure 4 is a transverse section through the apparatus with the cover in open position, without the grill units or cages in position.

Figure 5 is a cross-sectional view about on the line 5—5 of Figure 2.

Figure 6 is a longitudinal section through the grill unit with the cover of the grill or cage in closed position. This view is taken at right angles to the slot in the drive end.

Figure 7 is an enlarged view on the line 7—7 of Figure 6, but with the cover of the grill unit or cage open to the extent of 90° from its closed position.

Figure 8 is a perspective view of the heating device.

Figure 9 is a wiring diagram which may be used in the apparatus.

Figure 1:
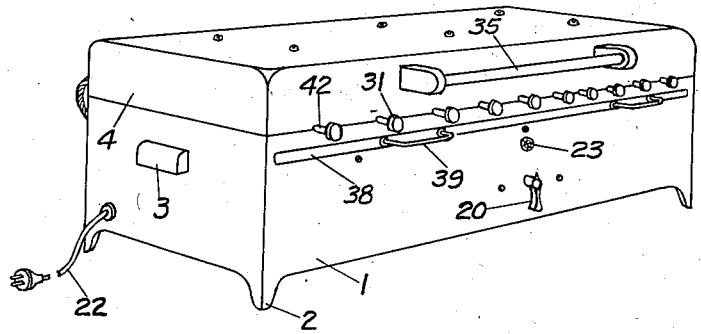
Figure 1 is a perspective view of one of the pieces of apparatus to be described.

Referring now to the details wherein like numbers refer to corresponding parts in the various views, 1 is a box-like casing or container having feet 2 on which it rests. Handles 3 may be provided at each end of the casing 1 for the purpose of carrying or moving it around. The casing 1 has a cover 4 preferably hinged to the casing 1 and adapted to be held in open position as shown in Figure 4 by the straps 5. Positioned within the confines of the cover 4 is a heating device comprising a group of resistance coils 6 carried on a suitable heat-resisting insulator 7 that may be fastened to the cover by means of the screw-holes 8, screws 9 and bushings 10. While, in Figure 8, the coils 6 are shown connected in series, they may be connected in any other suitable manner.

The casing 1 has a rear compartment 11 in the upper portion of which is carried a plurality of gear wheels 12, the gear wheels 12 being carried on stub shafts 13 supported by the side members of the compartment 11. Each of the stub shafts 13 has a bore 14 therein and a pin 15 passing across the bore 14 for a purpose which will be hereinafter pointed out.

Figure 2:
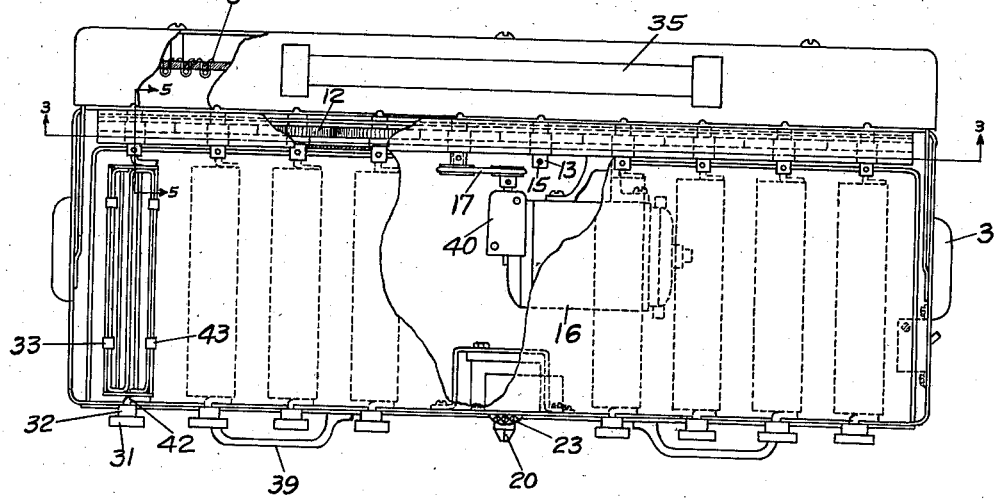
Figure 2 is a plan view of the apparatus shown in Figure 1, with the cover open and a small portion broken away to show the location of the heating device. The view also shows one of the grill units or cages in operative position, the location of the other grill units being indicated by dotted lines.
Figure 3:
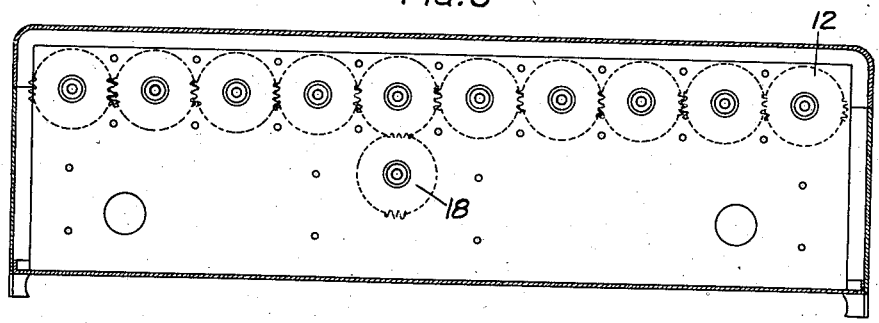
Figure 3 is a section on the line 3—3 of Figure 2.

Mounted within the casing 1 is a small electric motor 16 having a gear reduction within the housing 40, which gear reduction is connected through a driving connection 17 with a gear 18 which is in mesh with one of the gears 12, all of which are in mesh as is indicated in Figures 2 and 3, so that as the common driving gear 18 is turned, all of the gears 12 are simultaneously turned. The motor 16 is controlled by a switch 19 and the circuit through the heating coils 6 is controlled by a switch 20, whereby only a part or all of the coils may be switched into circuit somewhat as indicated in Figure 9; that is to say, when the switch 20 is in fully closed position, the switch blade 21 connects the three groups of coils in parallel across the supply circuit 22. A small pilot lamp 23 is preferably used to indicate that the circuit is closed through the heating device.

Referring now to the grill units or meat cages per se, each unit is made up of a pair of similar end plates 24 and 25, to which is attached, as by brazing, a strip 26 of suitable metal which is preferably circular and made all in one piece and bent back and forth on itself as indicated in Figures 6 and 7, to form an open lattice, grill-work or cage. The cage is preferably square in cross-section, so that when it turns, the contents of the cage may be brought the closest, except for a round cage, to the heating device. Each of the plates 24 and 25 is provided with apertures 27.

To the plate 24 is attached a member 28 having a forked end 29 adapted to enter, with a free sliding fit, the bore 14 in the shaft 13 of one of the gears, the forked end 29 passing over the pin 15 to provide a driving connection.

The plate 25 is provided with a member 30 carrying a knob 31 having a shank 32 which may be provided with an insert for screwing onto the end 41 of the member 30. The member 30 is provided with a circular portion 42 that has a bearing in the edge of the casing 1 as shown in Figures 1 and 2, this outer bearing end of the grid being held in place by the cover 4 which preferably has an arcuate portion formed to fit over the top of the portion 42, thus providing a secure seat for the outer bearing of the grill unit.

The cage or grill unit has one side adapted to be opened as shown in Figure 7, one of the wires or strips being hinged to an adjacent wire strip by a pair of clamps 43, a pair of spring clips 33 being provided to snap over the strip member 34 of the cage when the cover thereof is in closed position as shown in Figure 6.

From what has been said, it will be understood that the grill unit as just described may be readily manipulated or placed in position within the apparatus as shown at the extreme left of Figure 2, wherein one of the grill units is shown in position. The cover 4 is provided with a handle 35 so that it may be readily opened and closed. Current is conveyed from the switch 20 to the heating device in any satisfactory manner as by means of a flexible cable 36.

Supported on a pair of end brackets 37 located just below the plane of the grill units and attached to the casing 1, is a drip-pan 38 having handles 39 for manipulating it. While the pan is shown in one piece, it may be subdivided into two or more parts, depending on the length of the apparatus.

From the previous description, it will be seen that when the motor switch 19 is closed, the motor 16 starts to operate and through the medium of the gears as described, all of the grill units are turned simultaneously and very slowly, thereby continually presenting a new surface of the strips of steak, frankfurters, or whatever is in the cages or grill units, to the heating device. After the cooking or grilling has been carried on a sufficient length of time, the cover 4 is raised by means of the handle 35 and any one or all of the grill units may be quickly removed in the manner described, it being assumed that the motor may be stopped to unload and reload the grills.

If only say two or three of the grill units are needed to be in operation to take care of an order, then the switch 20 can be moved to operate the heating coils at one end or portion of the heating device, and the grill units located in the apparatus accordingly. By this arrangement, a great saving is made on the part of the grill units required to be in operation. The strips of steak, or "steak sticks", frankfurters or the like may be quickly roasted or grilled in this apparatus and as soon as the operation is completed, the switches 19 and 20 may be opened, thereby eliminating the useless consumption of power.

The apparatus is readily portable and can be advantageously used in many places where food of the character described is to be cooked.

What I claim is:

1. An apparatus of the class described including, a casing having a hinged top cover, an electric heating device composed of units arranged and mounted within the inner portion of the cover all in substantially the same plane, a plurality of grill units individually and removably mounted for and while in rotation in the casing at the junction of the cover and casing so as to be in a horizontal plane closely adjacent said heating device when the cover is in closed position, a drip pan carried by the casing below said grill units, means for rotating said grill units only on their own axes, and means for conveying current to said heating device.

2. An apparatus as set forth in claim 1, further characterized in that said grill units are arranged in a longitudinal row and said means for rotating the grill units comprises an electric motor, a main driving gear coupled to the motor and driving a plurality of intermeshing gears, one for each of said grill units, and coupled thereto through a quickly detachable connection.

3. An apparatus as set forth in claim 1, further characterized in that the means for rotating said grill units includes a source of power, an individual driving device for each grill unit connected at one end thereof to said source of power through a quickly detachable connection consisting of a slip joint, and further characterized in that the opposite end of each grill unit has a bearing extending beyond the side wall of the casing with a handle on said extension for the purpose described.

4. In an apparatus as set forth in claim 1, further characterized in that the means for rotating the grill units includes a longitudinal row of gears carried on stub shafts, one for each unit, all arranged in a compartment, the side walls of which act as supports for the stub shafts of said gear wheels.

5. For a grilling apparatus of the class described, a detachable and rotatable grill unit including; a pair of end plates having strips permanently connected thereto but arranged in open grill fashion to form a cage of fixed length and cross section, the strips on one side being arranged to form a cover for the cage, one of said plates having a member formed to make quick detachable engagement with an operating means whereby the grill unit may be removed or put into operative position while said means are continuously rotated, the other plate having a bearing and handle member fastened thereto, said cage having a cross section such that the contents of the cage, when rotated, may be substantially always at the same distance from the heating element.

6. A grill unit as set forth in claim 5, further characterized in that one of the plates has a forked member to make a sliding engagement with a driving means having a recess and cross-pin to receive the forked member, while the handle end has a part to act as the bearing for the grill unit.

7. For a grilling apparatus of the class described, a continuously rotatable grill unit in the form of an elongated cage, one side of which is arranged to swing open to load or unload the cage, said cage having support plates at opposite ends, one plate having a bearing and handle for manipulating the cage, while the other plate is provided with means for making a quick detachable engagement with an operating means adapted for continuous rotation.

8. A portable electric grill including a casing having a cover, a plurality of grill units arranged transversely across the casing at its junction with the cover, said units having bearings partly in the casing and partly in the cover, a heating device carried within the cover closely adjacent said grill units, means for bringing into operation the whole or any part of said heating device, depending on the grill units in operation, a removable drip-pan carried by the casing just below the grill units, said grill units being of fixed length and cross section and in the form of a lattice-work cage having at least one side that can be swung open to give access to the interior of the cage, each unit being rotatable in and quickly removable from the casing while the unit is being rotated, and a common means for rotating all the grill units simultaneously.

9. An electric grilling apparatus as set forth in claim 8, further characterized in that said grill units each have a bearing support at one end for forming a slidable driving connection with its driving means, and also have a bearing member at their opposite ends together with a suitable handle for manipulating the units for loading and unloading the same.

10. An apparatus of the class described, a trunk-like casing having a hinged cover, a plurality of grill units mounted in the casing at the cover junction with the casing, a heating device positioned in the cover above and closely adjacent the grill units when the cover is in closed position, means for conveying current to said heating device, means for rotating said grill units, said grill units being of fixed length and individually removable while any one or all are being rotated, said grill units being in the form of cages having a fixed cross section such that the contents of the cages may be brought very close to the heating device and at substantially the same distance at all points of rotation of the cages.

EDWARD A. WEISEL.